J. P. JENSEN.
SAW HANDLE.
APPLICATION FILED OCT. 30, 1907.
917,871.
Patented Apr. 13, 1909.
3 SHEETS—SHEET 1.
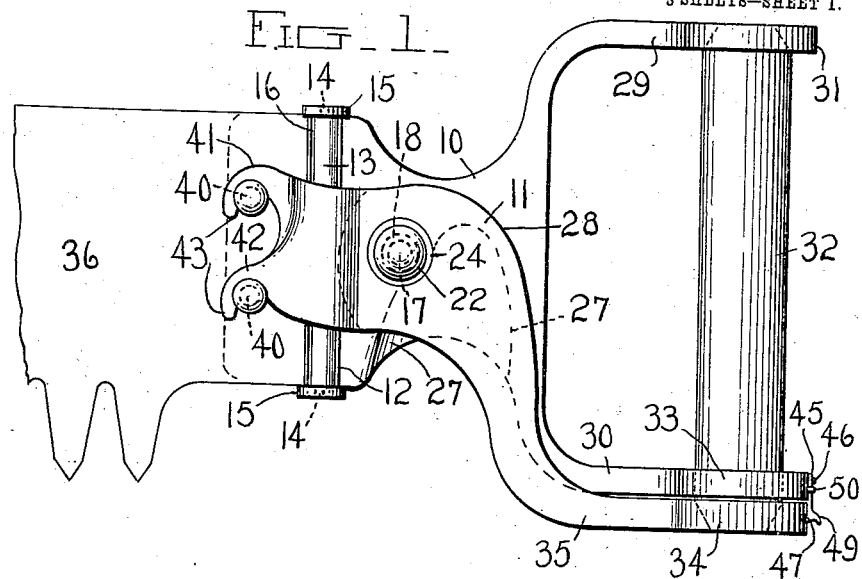
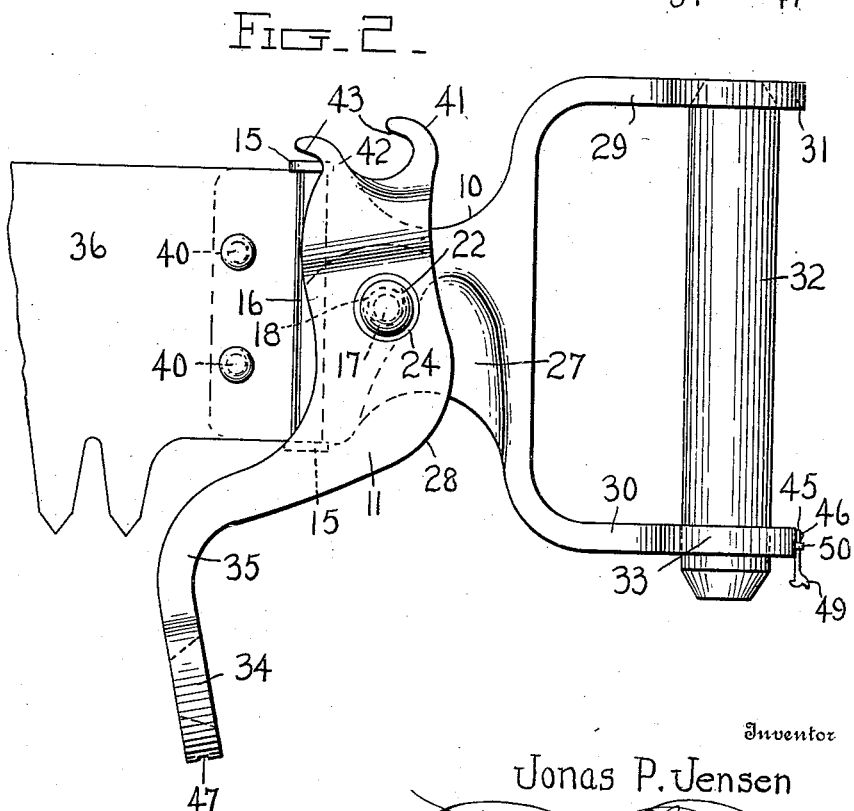
Witnesses
L. B. James
F. J. Smith
Inventor
Jonas P. Jensen
By Chandlee & Chandlee
Attorneys J. P. JENSEN.
SAW HANDLE.
APPLICATION FILED OCT. 30, 1907.
917,871.
Patented Apr. 13, 1909.
3 SHEETS—SHEET 2.
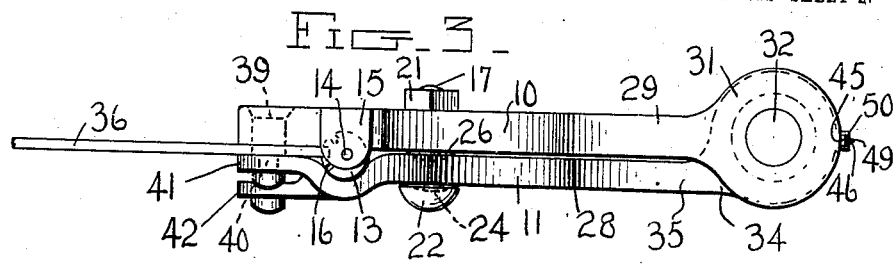
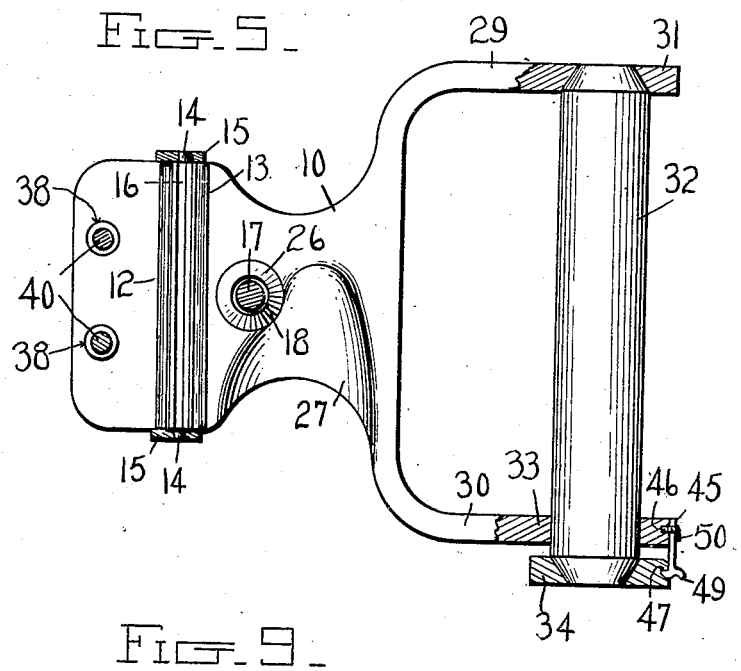
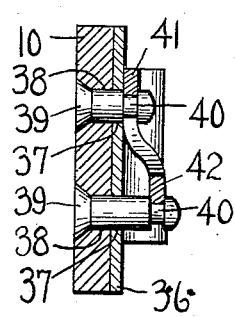
Witnesses
L. B. James
F. G. Smith
Inventor
Jonas P. Jensen
By Chandlee & Chandlee
Attorneys

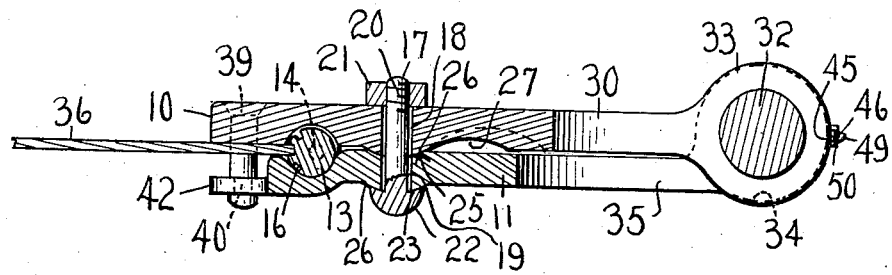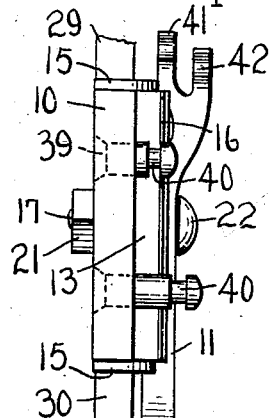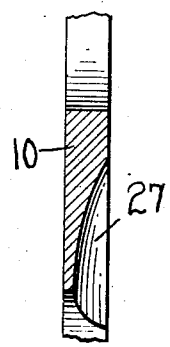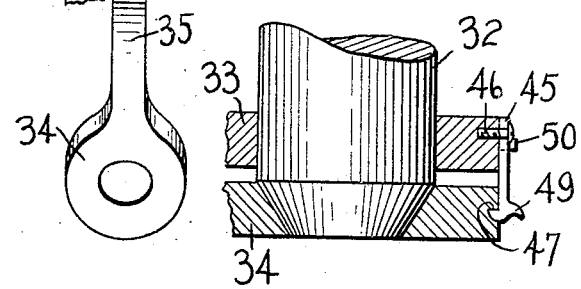

UNITED STATES PATENT OFFICE.

JONAS P. JENSEN, OF PARK, WASHINGTON.

SAW-HANDLE.

No. 917,871.   Specification of Letters Patent.   Patented April 13, 1909.

Application filed October 30, 1907. Serial No. 399,846.

*To all whom it may concern:*

Be it known that I, JONAS P. JENSEN, a citizen of the United States, residing at Park, in the county of Whatcom, State of Washington, have invented certain new and useful Improvements in Saw-Handles; and I do hereby declare the following to be a full, clear, and exact description of the invention, such as will enable others skilled in the art to which it appertains to make and use the same.

This invention relates to saw handles and more particularly to that class which are so constructed as to be attachable to and detachable from any of the ordinary forms of cross cut saws.

The primary object of the invention is to provide, as stated above, a handle of this class which will be universal in its application and at the same time to provide a handle which may be attached without the employment of tools.

Broadly stated, the handle consists of a pair of members connected for turning movement with respect one to the other and in so forming one member that when the other member is turned with respect thereto, the latter member will have its saw blade engaging portion swung in a direction away from the other member and away from the saw blade. This construction permits of a quick and ready release of the saw blade as well as a ready attachment of the handle thereto.

The handle further consists, in part, of a roller which is rotatably journaled in a channel formed in the inner face of one of the handle members and which is provided with a plurality of longitudinally extending grooves or corrugations in which the end edge of the saw blade is interchangeably engageable and this roller is adapted to have a slight turning movement at the time the handle members are relatively swung to position to clamp the saw blade, so as to bind the said edge of the blade and assist in holding it firmly in place.

In the accompanying drawings, Figure 1 is a side elevation of the handle and one end of a cross cut saw blade, the handle being attached to the blade, Fig. 2 is a similar view but showing one of the handle members swung to position to release the blade, Fig. 3 is a top plan view of the handle and blade, Fig. 4 is a front edge view of the handle with the blade removed, Fig. 5 is a vertical longitudinal sectional view through the handle with the blade removed, Fig. 6 is a horizontal sectional view through the handle and showing the same attached to the blade, Fig. 7 is a detail vertical transverse sectional view through the handle rearwardly of the pivot for the two handle members, Fig. 8 is a detail vertical sectional view through the members showing the latch for locking them in position to grip the saw blade, and, Fig. 9 is a similar view taken through the studs and the portions of the handle members and the saw blade through which the studs are passed.

As shown in the drawings the saw handle embodying my invention consists, primarily, of a pair of handle members one of which is indicated by the numeral 10 and the other by the numeral 11 and it is between these handle members that the saw is to be clamped, one of the handle members being cammed as will be presently described and the other, 11, being in the nature of a locking or clamping member.

The handle member 10, which may be either of hard wood or metal, has its inner face substantially flat except for a cam portion and a groove or channel. This channel is indicated by the numeral 12 and a roller 13 is provided with reduced end portions 14 which are received in bearings 15 formed at each end of the channel 12. In this manner the roller is journaled in the channel. The roller 13 is provided with a plurality of longitudinally extending grooves or corrugations 16 the function of which will be presently stated, and for a reason which will also be presently described the roller has its reduced end portions formed off center or eccentrically with respect to the true axis of the roller. The clamping handle member 11 is pivoted to the member 10 by means of a bolt 17 which is passed through an opening 18 in the member 10 and an opening 19 in the member 11. That end of the bolt 17 which is passed through the opening 18 is threaded as at 20 and has engaged upon it a nut 21 and the bolt is provided at its other end with a head 22 which has its inner face concaved as indicated at 23 to conform to an annular convexed raised portion 24 formed upon the member 11 and surrounding the opening 19 therethrough. The face of the member 11 other than that upon which the raised portion is formed is concaved surrounding the opening 19 as is indicated at 25 and in this concavity is received a convex raised portion 26 formed upon the inner face of the member 10 in identically the same relation as the portion 24 upon the member 11. The openings in the two members 10 and 11 are preferably of slightly greater diameter than the diameter of the bolt for a purpose which will now be made apparent. The handle member 10 has its inner face formed with a cam portion which is produced by cutting in the said face as is indicated at 27 and that portion of the handle member which is indicated by the numeral 28 is designed to ride over this cam portion which portion, by reason of its conformation, causes, during such movement of the member 11, the said member to have its forward end portion moved in a direction away from the member 10. It will be understood that by reason of the fact that the bolt 17 is of less diameter than the openings through which it is engaged, this member 11 may have the rocking or lateral movement above described, and it will further be understood that by reason of the fact that this cam portion 27 merges into the inner faces of the member 10, the member 11 will have its front end portion forced in the direction of the inner face of the member 10 when the said member 11 is at one limit of its movement, or in other words when its portion 28 has passed from the in-cut cam portion 27 to rest against the inner face proper of the member 10.

The handle member 10 is formed, at its rear edge, with an extension 29 and with an extension 30 the said extensions being directed respectively at the upper and lower ends of the said rear edge of the member. The extension 29 is formed at its outer end with a collar 31 the inner periphery of which is beveled to receive the upper beveled end of a hand grip 32. A collar 33 is formed at the extreme end of the extension and the hand grip 32 passes through this collar 33 and has its lower end beveled and seated in a collar 34 which has its inner periphery beveled as in the case of the collar 31 and is formed at the end of an extension 35 formed upon the clamping handle member 11.

The saw blade to which the handle is to be attached is indicated by the numeral 36 and has formed through it the usual pair of bolt openings 37. Similar openings, spaced to the same distance, are formed through the front end portion of the handle member 10 and are indicated by the numeral 38 and through the openings in the saw blade and in the said handle member 10 are inserted studs. These studs are of substantially the same diameter throughout their length except for a slightly flared head 39 formed at one end and a narrow reduced portion 40 formed adjacent the other end. The studs above described are as stated passed through the openings 37 and 38 with their heads bearing against the outer face of the member 10 and their opposite ends projecting through the saw blade and beyond the same.

Formed at the front end edge of the clamping handle member 11 and projecting forwardly from the upper ends of said edge is a hook 41 and an offset hook 42 is formed at the said edge but at the lower end thereof. These hooks are, as stated, directed forwardly and they are also directed downwardly as indicated at 43 and they are designed for engagement, when the clamping handle member 11 is swung to clamp the saw blade, in the reduced portions 40 of the studs. In order that the hook 42 may pass the stud which the hook 41 engages, it is offset as stated, and the stud with which the said hook 42 engages is consequently of greater length than the one first mentioned although its reduced portion 40 is formed in identically the same relation to its end as is the reduced portion 40 of the other stud.

The manner of attaching the handle to the saw blade is as follows, it being understood that the handle may be detached by reversing this operation: One end of the saw blade is placed flat against the inner face of the handle member 10 with its openings 37 in registration with the openings 38 and with its end edge seated in one of the grooves or channels of the corrugated roller 13. The member 11 is at this time in inoperative position with its front end portion considerably spaced from the handle member 10. The said member 11 is then swung with its lower end to the right and with its portion 28 riding over the cam in-cut portion 27. The member 11 is brought in this manner with its front end portion in clamping engagement with the saw blade and at the same time the member 11 is moved in the manner stated, it rides over the roller 13 and serves to rotate this roller to a slight degree but sufficiently to cause it to have a binding action upon the said end edge of the saw blade. I have found it expedient to form the grooves or channels 16 in the roller 13, of different widths to suit different thicknesses of saw blades and it will be understood that by reason of the fact that the roller is journaled off center or eccentrically, a firmer binding action will be obtained than would otherwise be the case. It will also be understood in connection with my invention and more particularly in connection with the hand grip construction that this grip is removable or, as a matter of fact, will drop from place when the handle proper is disengaged from the saw blade and that it will be firmly clamped in position, however, when the handle is attached to the saw blade.

In order to hold the handle members in position to clamp the saw blade I have provided a spring latch which will now be described.

The latch just mentioned is in the form of a leaf spring 45 which is secured to the end 33 of the handle member 30 by means of a screw 46 and is provided at one of its ends with an integral lug 47 which is designed to seat in an opening 48 formed in the annular end 34 of the handle member 35, there being a finger piece 49 formed also integral with the said end of the latch 45 whereby the latch may be sprung with its lug out of engagement with the opening. To prevent twisting of the latch out of alinement, a notched boss 50 is formed upon the said annular end portion 33 of the handle member 30 and the upper end of the latch 45 is seated in the notch in this boss.

What is claimed, is—

1. A saw handle comprising a pair of members pivoted to swing in parallel planes and adapted to receive a saw blade between them, studs carried by one member and arranged to project through openings in the saw blade, the other member being formed with hooks engageable with said studs, and means for holding the two members closed.

2. A saw handle comprising a pair of members pivoted to swing in parallel planes and adapted to receive a saw blade between them, studs loosely carried by one member and arranged to project through openings in the said blade, the other member being formed with hooks engageable with said studs when the second mentioned member is swung upon the first mentioned member, and means for holding the two members with the hooks of the second mentioned member in such engagement.

3. A saw handle comprising a pair of members pivoted to swing in parallel planes and adapted to receive a saw blade between them, studs carried by one member and arranged to project through openings in the saw blade, one of the studs being of greater length than the other, the other member being formed with two hooks one being offset beyond the other and being engageable with the longer one of the two studs and to pass the other stud, and means for holding the two members closed.

4. A saw handle comprising a pair of members pivoted to swing in parallel planes and adapted to receive a saw blade between them, one of said members being movable toward and from the other member, and said other member being formed with a cam portion with which the said movable member is engageable.

5. A saw handle comprising a pair of pivoted members swinging in parallel planes and adapted to receive a saw blade between them, one of said members being movable toward and from the other member, and said other member being formed with the concaved cam portion with which the said movable member is engageable.

6. A saw handle comprising a pair of members pivoted to swing in parallel planes, one of said members being formed with a pair of arms, a hand grip inserted through one of the arms and seating at one end in a seat formed in the other arm, the other member being formed with an arm having a seat for the other end of the hand grip, and means for holding the members in closed position.

7. A saw handle comprising a pair of members pivoted to swing in parallel planes, one of said members being formed with a pair of arms, a hand grip inserted through one of the arms and seating at one end in a seat formed in the other arm, the other member being formed with an arm having a seat for the other end of the hand grip, and a spring latch for holding the members in closed position.

8. A saw handle comprising a pair of members pivoted to swing in parallel planes and adapted to receive a saw blade between them, studs carried by one member and arranged to project through openings in the saw blade, the other member being formed with hooks engageable with said studs, and a spring latch for holding the two members closed.

9. A saw handle comprising a pair of pivoted members arranged to receive a saw blade between them, a corrugated roller carried by one of the members and arranged to receive in any of its corrugations the end edge of the saw blade, the movement of the other member to gripping position serving to partly rotate the said roller.

10. A saw handle comprising a pair of pivoted members arranged to receive a saw blade between them, a corrugated roller carried by one of the members and arranged to receive in any of its corrugations the end edge of the saw blade, the movement of the other member to gripping position tending to partly rotate the said roller.

In testimony whereof, I affix my signature, in presence of two witnesses.

JONAS P. JENSEN.

Witnesses:
C. A. HORST,
J. B. ABRAMS.